(12) United States Patent
Gray

(10) Patent No.: US 12,520,387 B1
(45) Date of Patent: Jan. 6, 2026

(54) ICE-PREVENTING HEATED MAT

(71) Applicant: Claude Gray, Madison Heights, MI (US)

(72) Inventor: Claude Gray, Madison Heights, MI (US)

( * ) Notice: Subject to any disclaimer, the term of this patent is extended or adjusted under 35 U.S.C. 154(b) by 671 days.

(21) Appl. No.: 17/967,961

(22) Filed: Oct. 18, 2022

(51) Int. Cl.
  *H05B 1/02* (2006.01)
  *H05B 3/22* (2006.01)

(52) U.S. Cl.
  CPC ............... *H05B 3/22* (2013.01); *H05B 1/02* (2013.01)

(58) Field of Classification Search
  None
  See application file for complete search history.

(56) References Cited

U.S. PATENT DOCUMENTS

| | | | |
|---|---|---|---|
| 5,591,365 A * | 1/1997 | Shields | E04D 13/103 |
| | | | 219/544 |
| 5,966,502 A | 10/1999 | Pearce | |
| 6,051,811 A * | 4/2000 | Hardison | H05B 3/36 |
| | | | 135/119 |
| 6,211,493 B1 * | 4/2001 | Bouman | E01C 11/265 |
| | | | 219/528 |
| 6,278,085 B1 * | 8/2001 | Abukasm | H05B 3/36 |
| | | | 219/544 |
| D562,611 S | 2/2008 | Rundle | |
| 9,945,080 B2 | 4/2018 | Caterina | |
| 2019/0338471 A2 * | 11/2019 | Naylor | E01C 11/265 |

FOREIGN PATENT DOCUMENTS

WO 2006088510 8/2006

* cited by examiner

*Primary Examiner* — Elizabeth M Kerr

(57) ABSTRACT

The ice-preventing heated mat is configured for use on the ground. The ice-preventing heated mat forms a barrier between the ground and the environment such that snow and ice accumulates on the superior surface of the ice-preventing heated mat. The ice-preventing heated mat melts the snow and ice that accumulates on the ice-preventing heated mat. The ice-preventing heated mat is used: a) in an individual mode; and, b) in an interoperation mode. In the interoperation mode, multiple instantiations of the ice-preventing heated mat are mechanically and electrically interconnected to form a larger surface area over which snow and ice can be melted. The ice-preventing heated mat comprises a mat structure and a control circuit. The mat structure forms the primary structure of the ice-preventing heated mat. The control circuit generates the heat used to melt the snow and ice.

14 Claims, 5 Drawing Sheets

ICE-PREVENTING HEATED MAT

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of elements constructed in the shape of a panel with channels. (F28F3/12)

SUMMARY OF INVENTION

The ice-preventing heated mat is configured for use on the ground. The ice-preventing heated mat forms a barrier between the ground and the environment such that snow and ice accumulates on the superior surface of the ice-preventing heated mat. The ice-preventing heated mat melts the snow and ice that accumulates on the ice-preventing heated mat. The ice-preventing heated mat is used: a) in an individual mode; and, b) in an interoperation mode. In the interoperation mode, multiple instantiations of the ice-preventing heated mat are mechanically and electrically interconnected to form a larger surface area over which snow and ice can be melted. The ice-preventing heated mat comprises a mat structure and a control circuit. The mat structure forms the primary structure of the ice-preventing heated mat. The control circuit generates the heat used to melt the snow and ice.

These together with additional objects, features and advantages of the ice-preventing heated mat will be readily apparent to those of ordinary skill in the art upon reading the following detailed description of the presently preferred, but nonetheless illustrative, embodiments when taken in conjunction 9 with the accompanying drawings.

In this respect, before explaining the current embodiments of the ice-preventing heated mat in detail, it is to be understood that the ice-preventing heated mat is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the ice-preventing heated mat.

It is therefore important that the claims be regarded as including such equivalent construction insofar as they do not depart from the spirit and scope of the ice-preventing heated mat. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
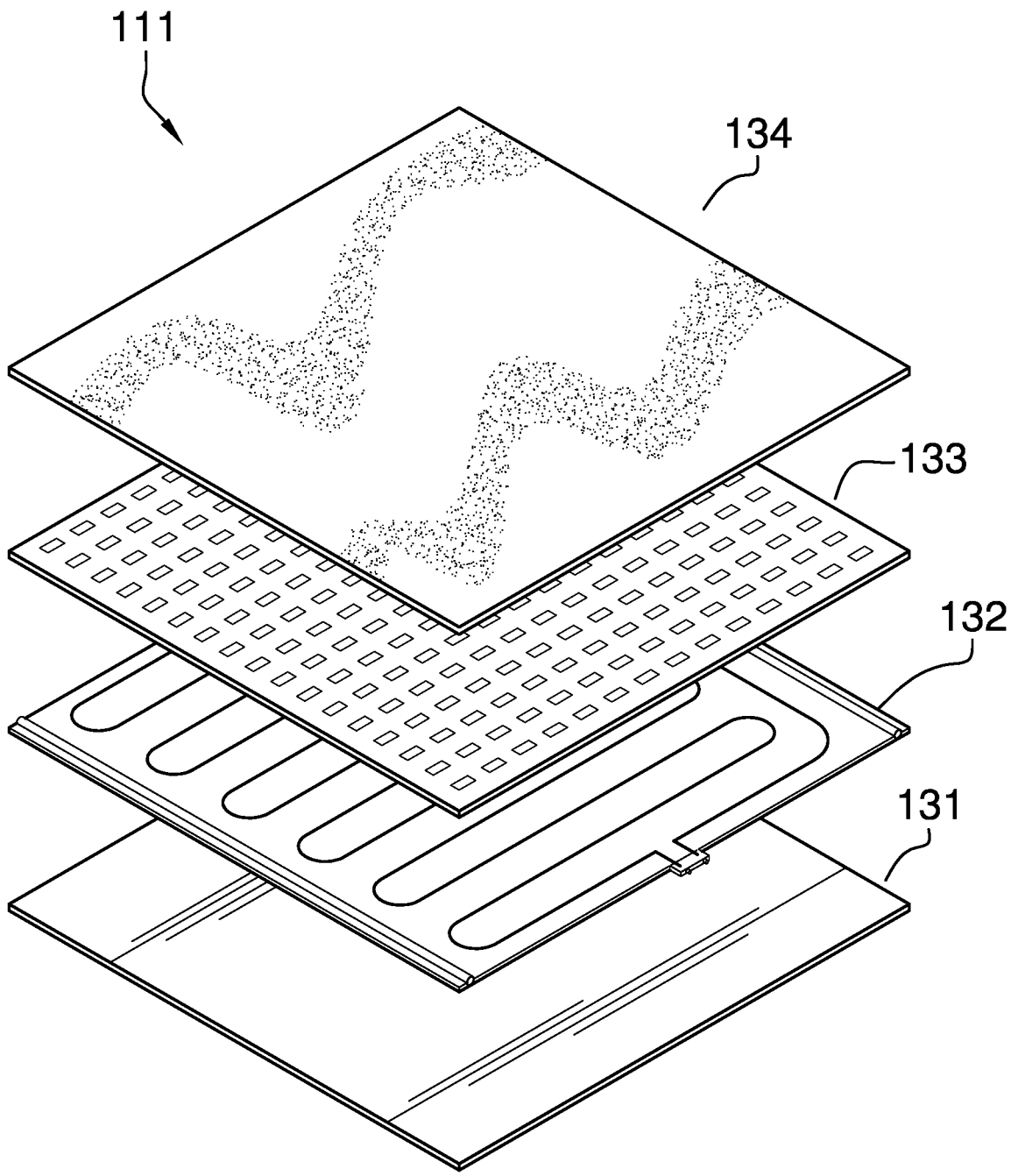
FIG. 1 is an exploded view of an embodiment of the disclosure.
Figure 2:
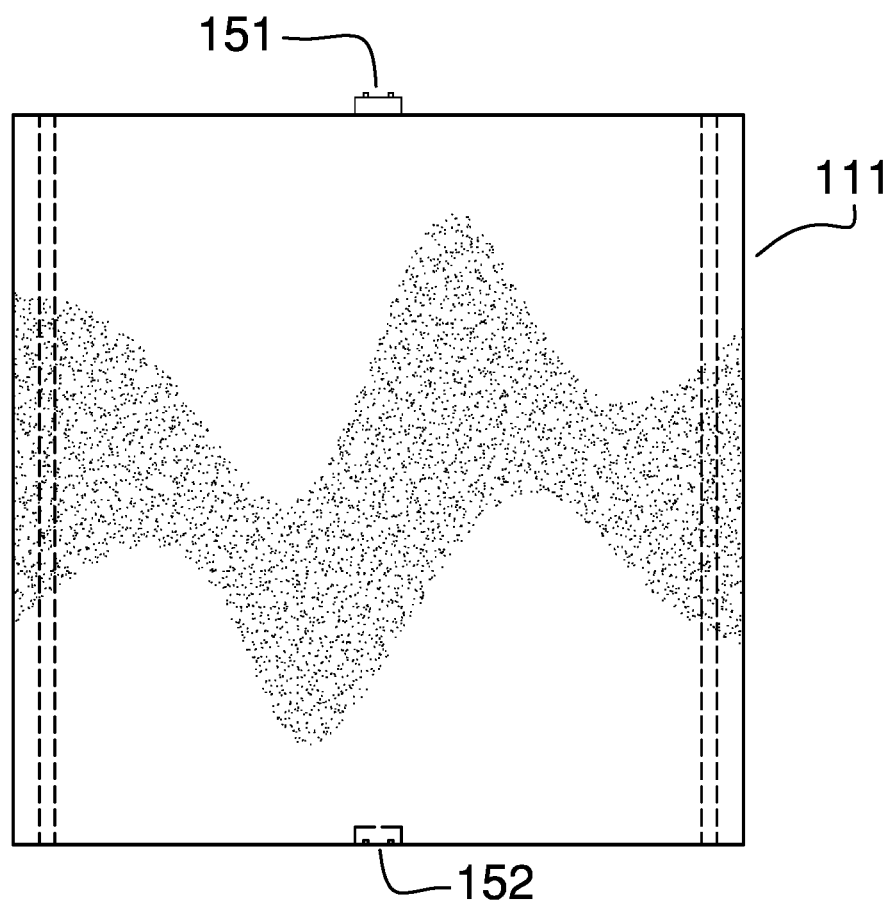
FIG. 2 is a top view of an embodiment of the disclosure.
Figure 3:
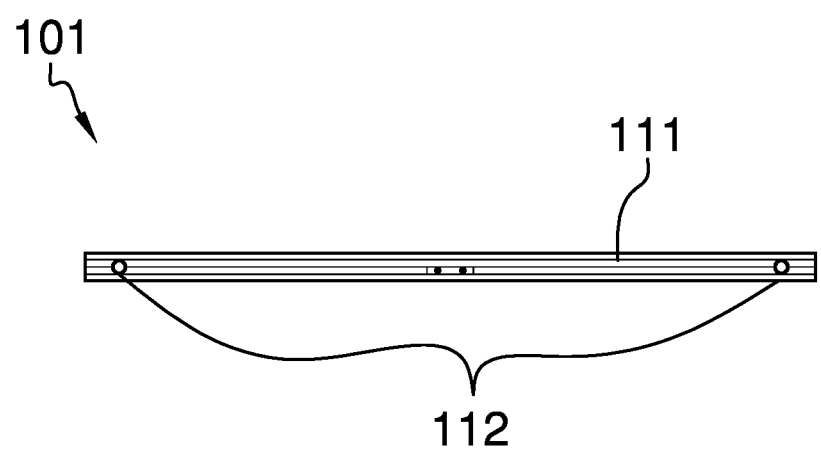
FIG. 3 is a side view of an embodiment of the disclosure.
Figure 4:
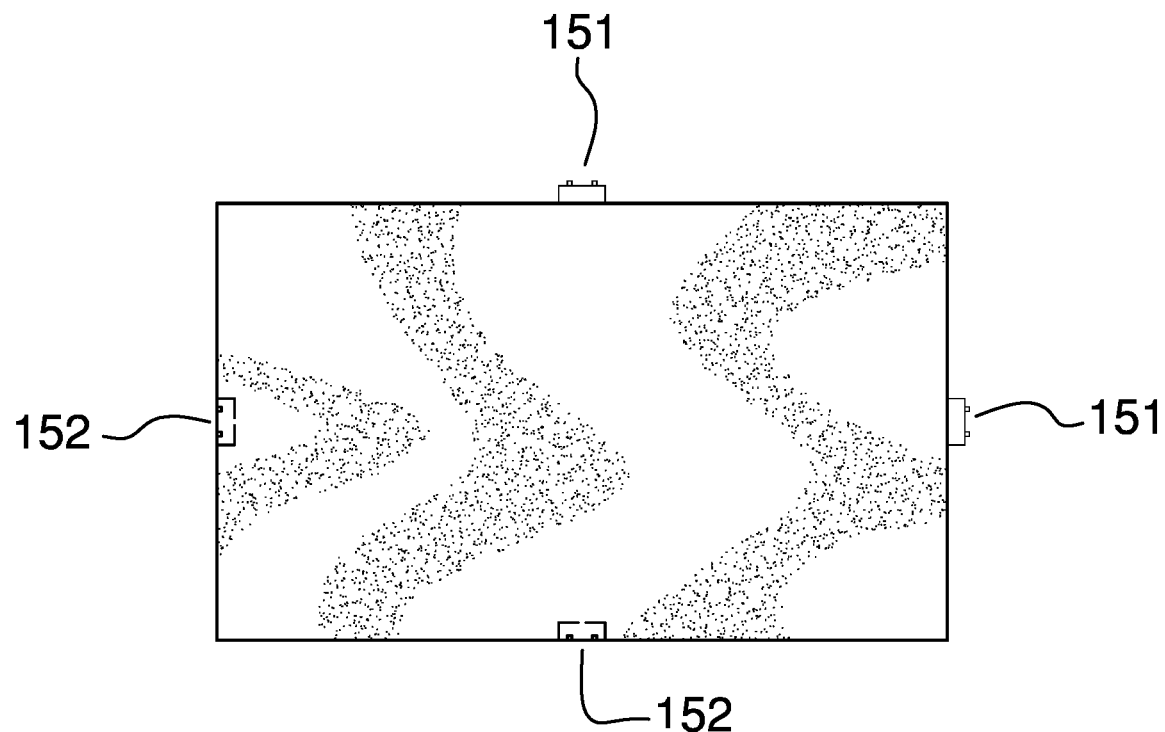
FIG. 4 is a bottom view of an embodiment of the disclosure.
Figure 5:
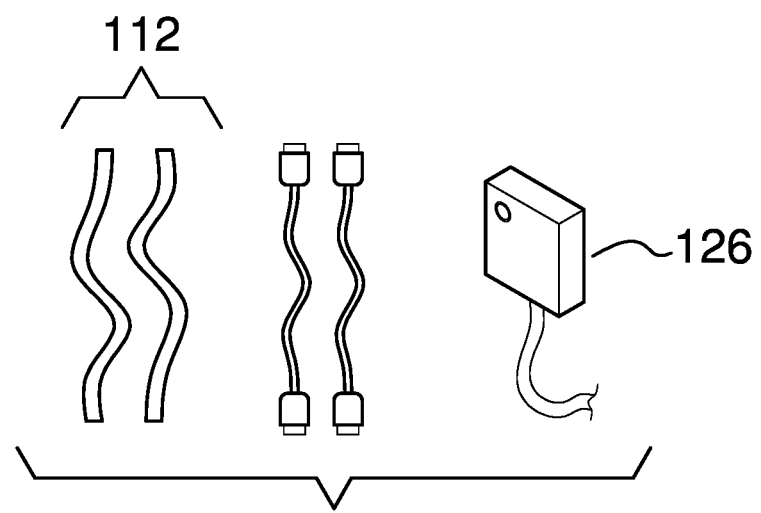
FIG. 5 is a detail view of an embodiment of the disclosure.
Figure 6:
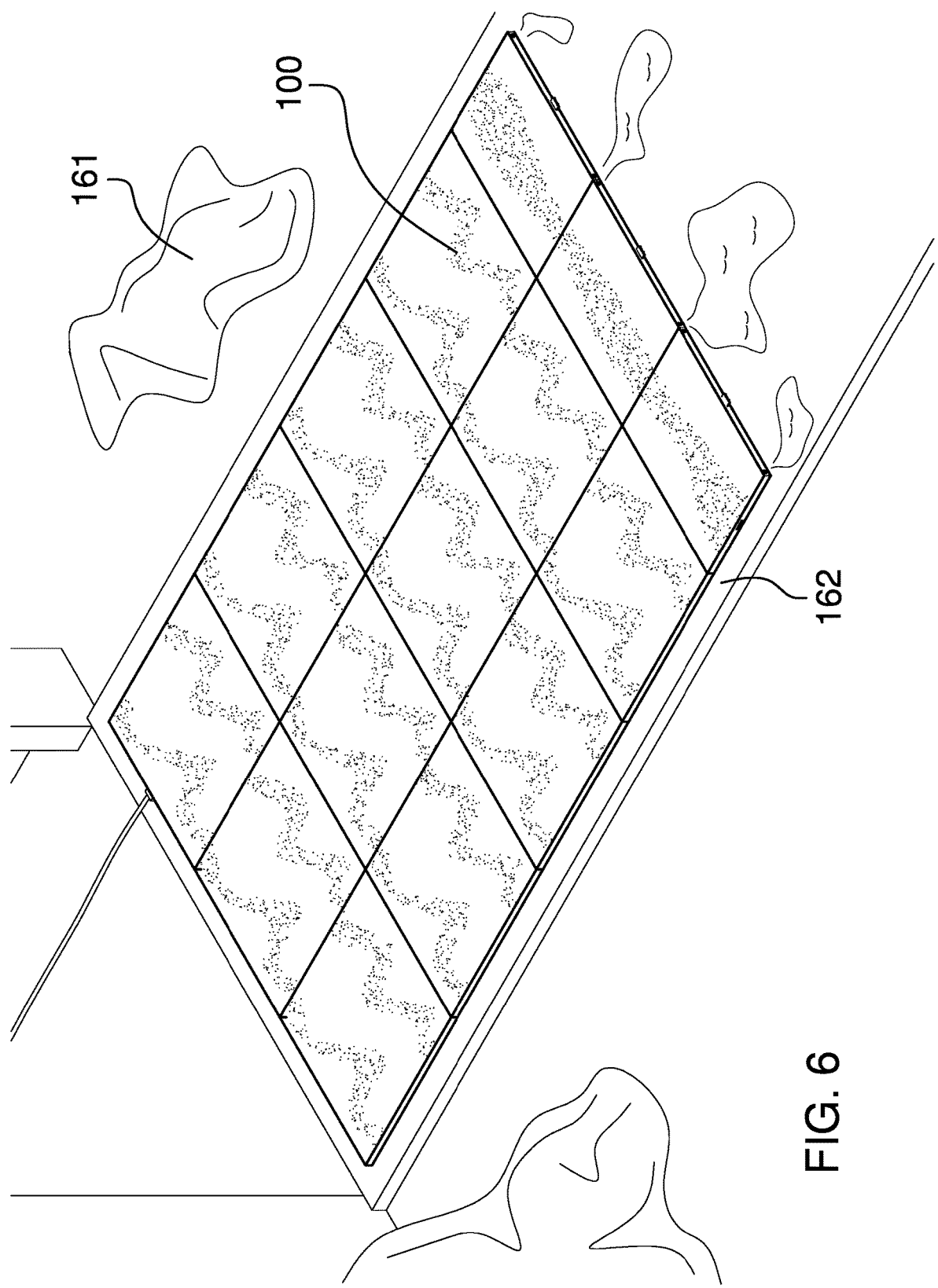
FIG. 6 is an in-use view of an embodiment of the disclosure.
Figure 7:
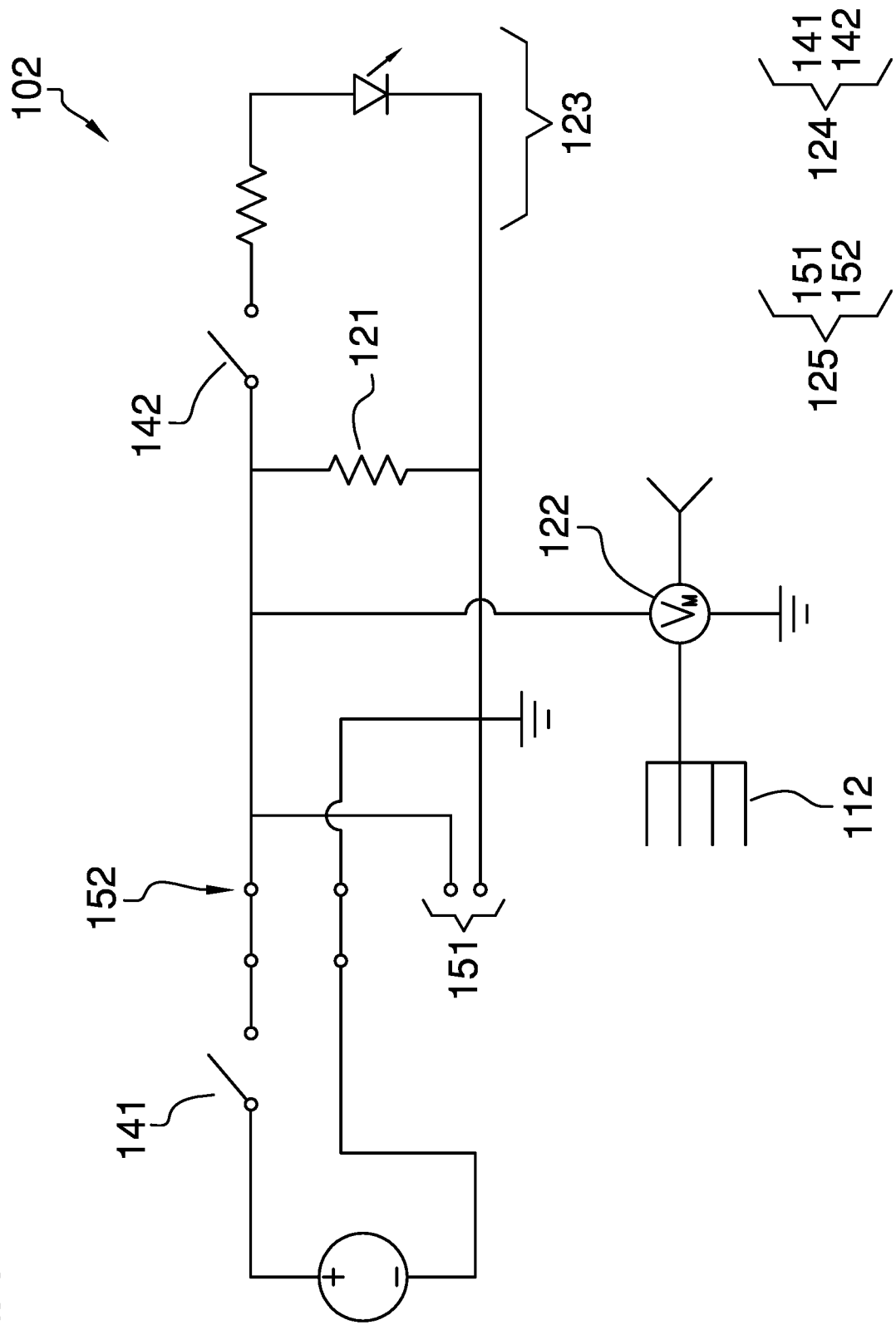
FIG. 7 is a schematic view of an embodiment of the disclosure.

Detailed reference will now be made to one or more potential embodiments of the disclosure, which are illustrated in FIGS. 1 through 7.

The ice-preventing heated mat 100 (hereinafter invention) is configured for use on the ground 162. The invention 100 forms a barrier between the ground 162 and the environment such that snow and ice 161 accumulates on the superior surface of the invention 100. The invention 100 melts the snow and ice 161 that accumulates on the invention 100. The invention 100 is used: a) in an individual mode; and, b) in an interoperation mode. In the interoperation mode, multiple instantiations of the invention 100 are mechanically and electrically interconnected to form a larger surface area over which snow and ice 161 can be melted. The invention 100 comprises a mat structure 101 and a control circuit 102. The mat structure 101 forms the primary structure of the invention 100. The control circuit 102 generates the heat used to melt the snow and ice 161.

The mat structure 101 forms the primary structure of the invention 100. The mat structure 101 is an elastomeric structure. The mat structure 101 is prism shaped structure. The mat structure 101 has a composite prism structure. The mat structure 101 has a disk shape. The elastic nature of the mat structure 101 allows the mat structure 101 to be deployed onto the ground 162 from a scrolled structure. The elastic nature of the mat structure 101 allows the mat structure 101 to be collapsed (rolled) back into the scroll structure for storage. The control circuit 102 mounts within the mat structure 101. The mat structure 101 is placed on the ground 162 that is to be protected from the snow and ice 161. The mat structure 101 forms a protective barrier that prevents the snow and ice 161 from reaching the ground 162. The mat structure 101 comprises a composite structure 111 and a drainage manifold 112.

The drainage manifold 112 is a fluid network that is installed within the composite structure 111. The drainage manifold 112 captures liquid phase water that seeps into the composite structure 111 during the melting of the snow and ice 161. The drainage manifold 112 forms a fluidic connection with the control circuit 102. The control circuit 102 draws any water accumulated within the drainage manifold 112 out of the drainage manifold 112. The control circuit 102 discharges the water removed from the drainage manifold 112 from of the invention 100.

The composite structure 111 forms the primary structure of the mat structure 101. The composite structure 111 is an elastomeric structure. The composite structure 111 has a composite prism structure. The composite structure 111 has a disk shape. The elastic nature of the composite structure 111 allows the composite structure 111 to be deployed onto the ground 162 from a scrolled structure. The elastic nature of the composite structure 111 allows the composite structure 111 to be collapsed (rolled) back into the scroll structure for storage. The composite structure 111 is placed on the ground 162 that is to be protected from the snow and ice 161. The composite structure 111 forms the physical protective barrier that prevents the snow and ice 161 from reaching the ground 162.

The composite structure 111 further comprises an inferior layer 131, a heat transfer layer 132, an illumination layer 133, and a superior layer 134.

The inferior layer 131 forms the inferior structure of the mat structure 101. The inferior layer 131 is an elastomeric structure. The inferior layer 131 has a composite prism structure. The inferior layer 131 has a disk shape. The inferior layer 131 forms the structure of the mat structure 101 that is placed in contact with the ground 162. The elastic nature of the inferior layer 131 allows the mat structure 101 to be deployed onto the ground 162 from a scrolled structure. The elastic nature of the inferior layer 131 allows the mat structure 101 to be collapsed (rolled) back into the scroll structure for storage. The inferior congruent end of the inferior layer 131 is formed with a texture. The texture applied to the inferior congruent end of the inferior layer 131 prevents the mat structure 101 from shifting under a load during the deployment of the invention 100.

The heat transfer layer 132 forms a layer of the composite prism structure of the mat structure 101. The heat transfer layer 132 is an elastomeric structure. The heat transfer layer 132 has a composite prism structure. The heat transfer layer 132 has a disk shape. The elastic nature of the heat transfer layer 132 allows the mat structure 101 to be deployed onto the ground 162 from a scrolled structure. The elastic nature of the heat transfer layer 132 allows the mat structure 101 to be collapsed (rolled) back into the scroll structure for storage.

The heat transfer layer 132 is geometrically identical to the inferior layer 131. The heat transfer layer 132 is geometrically identical to the illumination layer 133. The heat transfer layer 132 is sandwiched between the inferior layer 131 and the illumination layer 133. The heat transfer layer 132 attaches to the illumination layer 133 such that the perimeter of the congruent end of the heat transfer layer 132 aligns with the perimeter of the congruent end of the illumination layer 133 of the composite structure 111. The heat transfer layer 132 attaches to the inferior layer 131 such that the perimeter of the congruent end of the heat transfer layer 132 aligns with the perimeter of the congruent end of the inferior layer 131 of the composite structure 111.

The elements of the control circuit 102 that are used to generate the heat used to melt the snow and ice 161 are contained within the heat transfer layer 132.

The illumination layer 133 forms a layer of the composite prism structure of the mat structure 101. The illumination layer 133 is an elastomeric structure. The illumination layer 133 has a composite prism structure. The illumination layer 133 has a disk shape. The elastic nature of the illumination layer 133 allows the mat structure 101 to be deployed onto the ground 162 from a scrolled structure. The elastic nature of the illumination layer 133 allows the mat structure 101 to be collapsed (rolled) back into the scroll structure for storage.

The illumination layer 133 is geometrically identical to the heat transfer layer 132. The illumination layer 133 is geometrically identical to the superior layer 134. The illumination layer 133 is sandwiched between the heat transfer layer 132 and the superior layer 134. The illumination layer attaches to the superior layer 134 such that the perimeter of the congruent end of the illumination layer 133 aligns with the perimeter of the congruent end of the superior layer 134 of the composite structure 111. The illumination layer 133 attaches to the heat transfer layer 132 such that the perimeter of the congruent end of the illumination layer 133 aligns with the perimeter of the congruent end of the heat transfer layer 132 of the composite structure 111.

The elements of the control circuit 102 that are used to generate the illumination of the control circuit 102 are contained within the illumination layer 133.

The superior layer 134 forms the superior structure of the mat structure 101. The superior layer 134 is an elastomeric structure. The superior layer 134 has a composite prism structure. The superior layer 134 has a disk shape. The superior layer 134 forms the structure of the mat structure 101 that is distal from the ground 162. The elastic nature of the superior layer 134 allows the mat structure 101 to be deployed onto the ground 162 from a scrolled structure. The elastic nature of the superior layer 134 allows the mat structure 101 to be collapsed (rolled) back into the scroll structure for storage. The superior congruent end of the superior layer 134 is formed with a texture. The texture applied to the inferior congruent end of the superior layer 134 prevents an individual from slipping on the mat structure 101 as the individual walks across the invention 100.

The superior layer 134 is a semitransparent structure. The superior layer 134 overlays the illumination layer 133 such that the illumination generated by the control circuit 102 is visible from the environment surrounding the mat structure 101.

The control circuit 102 is an electric circuit. The control circuit 102 generates the heat necessary to melt the ground 162 that has fallen on the superior layer 134. The control circuit 102 provides the motive forces that pump any water that has accumulated in the mat structure 101 out of the mat structure 101. The control circuit 102 generates an illumination that is visible from the environment surrounding the mat structure 101. The control circuit 102 initiates generating the illumination when an individual steps on the mat structure 101. The control circuit 102 discontinues generating the illumination when the individual steps off of the mat structure 101.

The control circuit 102 comprises a heating element 121, a vacuum pump 122, an illumination circuit 123, a plurality of switches 124, a plurality of electric terminations 125, and an external power source 126. The heating element 121, the vacuum pump 122, the illumination circuit 123, the plurality of switches 124, the plurality of electric terminations 125, and the external power source 126. The external power source 126 is an externally provided source of electric energy.

The heating element 121 is an electric device. The heating element 121 is a resistive heating element. The heating element 121 converts electric energy into heat. The heat generated by the heating element 121 melts the snow and ice 161 that has accumulated on the superior surface of the mat structure 101. The heating element 121 installs within the heat transfer layer 132 of the composite structure 111 of the mat structure 101.

The vacuum pump 122 is an electrical device. The vacuum pump 122 forms a fluidic connection with the drainage manifold 112 of the mat structure 101. The vacuum pump 122 converts electric energy into a pressure differential across the drainage manifold 112. The pressure differential generated by the vacuum pump 122 draws water out of the drainage manifold 112. The vacuum pump 122 discharges the drawn water from the invention 100. The vacuum pump 122 mounts in the mat structure 101.

The illumination circuit 123 is an electric circuit. The illumination circuit 123 converts electric energy into electromagnetic radiation. The illumination circuit 123 installs within the illumination layer 133 of the composite structure 111 of the mat structure 101. The illumination circuit 123 installs within the illumination layer 133 such that the illumination generated by the illumination circuit 123 is visible through the semi-transparent structure of the superior layer 134 of the mat structure 101.

Each switch selected from the plurality of switches 124 is an electric circuit element. Each switch selected from the plurality of switches 124 controls the flow of electric energy through the control circuit 102. Each electric termination selected from the plurality of electric terminations 125 forms an electric connection between an electric structure selected from group consisting of: a) the external power source 126; and, b) a second instantiation of the invention 100. The plurality of switches 124 further comprises a master switch 141 and a pressure switch 142.

The master switch 141 is an electric switch. The master switch 141 is a maintained switch. The master switch 141 controls the flow of electric energy from the external power source 126 into the control circuit 102 of any instantiation of the invention 100. The master switch 141 is also used to control the flow of electric energy from any other instantiation of the invention 100 into the invention 100.

The pressure switch 142 is a pressure plate switch. The pressure switch 142 mounts in the superior layer 134 of the composite structure 111 of the mat structure 101. The pressure switch 142 controls the flow of electric energy into the illumination circuit 123 of the control circuit 102. The pressure switch 142 enables the flow of electric energy into the illumination circuit 123 when the pressure switch 142 detects the weight of an individual on the superior surface of the composite structure 111. The pressure switch 142 disables the flow of electric energy into the illumination circuit 123 when the pressure switch 142 does not detect any weight on the superior surface of the composite structure 111.

The plurality of electric terminations 125 are used to receive electric energy from the external power source 126. The plurality of electric terminations 125 are further used to share electric energy between multiple instantiations of the invention 100. The plurality of electric terminations 125 further comprises a transfer plug 151 and a transfer port 152.

The transfer port 152 is an electric port. The transfer port 152 forms an electric connection with an electric circuit selected from the group consisting of: a) a plug associated with the external power source 126; and b) the transfer plug 151 of another instantiation of the control circuit 102 of another instantiation of the invention 100. The transfer port 152 shares electric energy between the control circuit 102 and the selected electric circuit.

The transfer plug 151 is an electric port. The transfer plug 151 forms an electric connection the transfer port 152 of another instantiation of the control circuit 102 of another instantiation of the invention 100. The transfer plug 151 shares electric energy between the control circuit 102 and the other instantiation of the control circuit 102 of the invention 100.

The following definitions were used in this disclosure:

Align: As used in this disclosure, align refers to an arrangement of objects that are: 1) arranged in a straight plane or line; 2) arranged to give a directional sense of a plurality of parallel planes or lines; or, 3) a first line or curve is congruent to and overlaid on a second line or curve.

Bulk Solid: As used in this disclosure, a bulk solid is a material that is formed from an accumulation of discrete particles. While the discrete particles of the bulk solid are solid materials, in aggregate the physical performance of bulk solid will exhibit fluid characteristics such as flow or taking the shape of a container.

Cant: As used in this disclosure, a cant is an angular deviation from one or more reference lines (or planes) such as a vertical line (or plane) or a horizontal line (or plane).

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinder, prism or pyramidal structures share the same line they are said to be aligned. When the center axes of two cylinder, prism or pyramidal structures do not share the same line they are said to be offset.

Channel: As used in this disclosure, a channel is a negative space used to guide the motion of an object of through which an object or fluid passes.

Collapsible: As used in this disclosure, the terms collapsible refers to an object that is configured such that the volume of the object is adjustable. By volume is meant the volume of the perimetrical boundary that contains the object. The verbs collapse and retract mean that the volume of the perimetrical boundary of the object changes from a larger volume to a smaller volume. The verbs expand and deploy mean that the volume of the perimetrical boundary of the object changes from a smaller volume to a larger volume.

Composite Material: As used in this disclosure, a composite material is a multilayer structure made of two or more joined layers of sheeting materials and coatings.

Composite Prism: As used in this disclosure, a composite prism refers to a structure that is formed from a plurality of structures selected from the group consisting of a prism structure and a pyramid structure. The plurality of selected structures may or may not be truncated. The plurality of prism structures are joined together such that the center axes of each of the plurality of structures are aligned. The congruent ends of any two structures selected from the group consisting of a prism structure and a pyramid structure need not be geometrically similar.

Compress: In this disclosure, compress means to apply a force to force a fixed mass of material into a smaller volume of space.

Congruent: As used in this disclosure, congruent is a term that compares a first object to a second object. Specifically, two objects are said to be congruent when: 1) they are geometrically similar; and, 2) the first object can superimpose over the second object such that the first object aligns, within manufacturing tolerances, with the second object.

Correspond: As used in this disclosure, the term correspond is used as a comparison between two or more objects wherein one or more properties shared by the two or more objects match, agree, or align within acceptable manufacturing tolerances.

Diode: As used in this disclosure, a diode is a two terminal semiconductor device that allows current flow in only one direction. The two terminals are called the anode and the cathode. Electric current is allowed to pass from the anode to the cathode.

Disk: As used in this disclosure, a disk is a prism-shaped object that is flat in appearance. The disk is formed from two congruent ends that are attached by a lateral face. The sum of the surface areas of two congruent ends of the prism-shaped object that forms the disk is greater than the surface area of the lateral face of the prism-shaped object that forms the disk. In this disclosure, the congruent ends of the prism-shaped structure that forms the disk are referred to as the faces of the disk.

Elastic: As used in this disclosure, an elastic is a material or object that deforms when a force is applied to it and that is able to return to its relaxed shape after the force is removed. A material that exhibits these qualities is also referred to as an elastomeric material. A material that does not exhibit these qualities is referred to as inelastic or an inelastic material.

Elastic Nature: As used in this disclosure, an elastic nature refers to a flexible structure that returns to its relaxed shape after the flexible structure has been deformed.

Elevation: As used in this disclosure, elevation refers to the span of the distance in the superior direction between a specified horizontal surface and a reference horizontal surface. Unless the context of the disclosure suggest otherwise, the specified horizontal surface is the supporting surface the potential embodiment of the disclosure rests on. The infinitive form of elevation is to elevate.

Environment: As used in this disclosure, an environment refers to the physical conditions surrounding an object. The term environment is often limited to the physical conditions that the object interacts with.

Exterior: As used in this disclosure, the exterior is used as a relational term that implies that an object is not contained within the boundary of a structure or a space.

External Power Source: As used in this disclosure, an external power source is a source of the energy that is externally provided to enable the operation of the present disclosure. Examples of external power sources include, but are not limited to, electrical power sources and compressed air sources.

Flexible: As used in this disclosure, flexible refers to an object or material that will deform when a force is applied to it but that will not necessarily return to its original shape when the deforming force is removed.

Flow: As used in this disclosure, a flow refers to the passage of a fluid past a fixed point. This definition considers bulk solid materials as capable of flow.

Fluid: As used in this disclosure, a fluid refers to a state of matter wherein the matter is capable of flow and takes the shape of a container it is placed within. The term fluid commonly refers to a liquid or a gas.

Fluid Impermeable: As used in this disclosure, the term fluid impermeable refers to: a) the ability of a structure to not allow a fluid to pass through the structure; or, b) the ability of a material not absorb through the exterior surfaces of the material a fluid that the material is immersed in or exposed to.

Fluidic Connection: As used in this disclosure, a fluidic connection refers to a tubular structure that transports a fluid from a first object to a second object. Methods to design and use a fluidic connections are well-known and documented in the mechanical, chemical, and plumbing arts.

Fluid Network: As used in this disclosure, a fluid network refers to a transport structure that: a) receives a fluid into the fluid network; b) transports the fluid through a series of pipes, valves, and manifolds; and, c) discharges the fluid from the fluid network.

Force: As used in this disclosure, a force refers to a net (or unopposed) measurable interaction that changes the direction of motion of an object, the velocity of motion of an object, the momentum of an object, or the stress within an object. The term work refers to a measure of the amount of energy that is transferred through the application of a force over a distance. The term power refers to a measure of the amount of energy that is transferred over a period of time.

Force of Gravity: As used in this disclosure, the force of gravity refers to a vector that indicates the direction of the pull of gravity on an object at or near the surface of the earth.

Form Factor: As used in this disclosure, the term form factor refers to the size and shape of an object.

Gas: As used in this disclosure, a gas refers to a state (phase) of matter that is fluid and that fills the volume of the structure that contains it. Stated differently, the volume of a gas always equals the volume of its container.

Geometrically Similar: As used in this disclosure, geometrically similar is a term that compares a first object to a second object wherein: 1) the sides of the first object have a one to one correspondence to the sides of the second object; 2) wherein the ratio of the length of each pair of corresponding sides are equal; 3) the angles formed by the first object have a one to one correspondence to the angles of the second object; and, 4) wherein the corresponding angles are equal. The term geometrically identical refers to a situation where the ratio of the length of each pair of corresponding sides equals 1.

Ground: As used in this disclosure, the ground is a solid supporting surface formed by the Earth. The term level ground means that the supporting surface formed by the ground is roughly perpendicular to the force of gravity. The term underground refers to an object being underneath the superior surface of the ground.

Heat: As used in this disclosure, heat refers to a transfer of energy between a first object and a second object such that the temperatures of the first object and the second object of one or both of the objects changes. In common usage, heat is said to flow from the warmer object to the cooler object. In systems where the combined energies of the first object and the second object remain constant, the equilibrium temperatures of the first object and the second object will be equal. The verb to heat is taken to mean the act of adding energy to the first object such that the temperature of the first object increases relative to a second object.

Heat Transfer: As used in this disclosure, heat transfer refers an exchange of thermal energy between a first object and a second object. In thermodynamics the first and second objects are often referred to as systems. This disclosure assumes that heat transfer occurs through three mechanisms: conduction, convection, and radiation. By conduction is meant that the heat is exchanged through the contact between the first object and the second object which facilitates the direct transfer of the energy of the vibration of the molecules of the first object to the molecules of the second object. By convection is meant that the heat is transferred through the exchange or movement of mass within and between the first object and the second object. By radiation is meant the transfer of heat energy in the form of (typically electromagnetic) waves between the first object and the second object.

Heating Element: As used in this disclosure, a heating element is a resistive wire that is used to convert electrical energy into heat. Common metal combinations used to form heat elements include a combination of nickel and Chromium (typical: 80/20), a combination of iron, chromium, and aluminum (typical 70/25/5), a combination of copper, nickel, iron, and manganese (typical 66/30/2/2) (use for continuously hot), and platinum.

Horizontal: As used in this disclosure, horizontal is a directional term that refers to a direction that is either: 1) parallel to the horizon; 2) perpendicular to the local force of gravity, or, 3) parallel to a supporting surface. In cases where the appropriate definition or definitions are not obvious, the second option should be used in interpreting the specification. Unless specifically noted in this disclosure, the horizontal direction is always perpendicular to the vertical direction.

Inelastic Nature: As used in this disclosure, an inelastic nature refers to a flexible structure that maintains its new shape after the flexible structure has been deformed.

Inferior: As used in this disclosure, the term inferior refers to a directional reference that is parallel to and in the same direction as the force of gravity when an object is positioned or used normally.

Instantiation: As used in this disclosure, an instantiation refers to a specific physical object or process that is created using a specification.

Interior: As used in this disclosure, the interior is used as a relational term that implies that an object is contained within the boundary of a structure or a space.

LED: As used in this disclosure, an LED is an acronym for a light emitting diode. A light emitting diode is a diode that is also a light source.

Liquid: As used in this disclosure, a liquid refers to a state (phase) of matter that is fluid and that maintains, for a given pressure, a fixed volume that is independent of the volume of the container.

Load: As used in this disclosure, the term load refers to an object upon which a force is acting or which is otherwise absorbing energy in some fashion. Examples of a load in this sense include, but are not limited to, a mass that is being moved a distance or an electrical circuit element that draws energy. The term load is also commonly used to refer to the forces that are applied to a stationary structure.

Load Path: As used in this disclosure, a load path refers to a chain of one or more structures that transfers a load generated by a raised structure or object to a foundation, supporting surface, or the earth.

Manifold: As used in this disclosure, a manifold is a pipe or chamber having several ports through which one or more fluids are gathered or distributed.

Maintained Switch: As used in this disclosure, a maintained switch is a switch that maintains the position that was set in the most recent switch actuation. A maintained switch works in an opposite manner to a momentary switch.

Mat: As used in this disclosure, a mat refers to a compressible three dimensional disk shaped structure.

Momentary Switch: As used in this disclosure, a momentary switch is a biased switch in the sense that the momentary switch has a baseline position that only changes when the momentary switch is actuated (for example when a pushbutton switch is pushed or a relay coil is energized). The momentary switch then returns to the baseline position once the actuation is completed. This baseline position is called the "normal" position. For example, a "normally open" momentary switch interrupts (open) the electric circuit in the baseline position and completes (closes) the circuit when the momentary switch is activated. Similarly, a "normally closed" momentary switch will complete (close) an electric circuit in the baseline position and interrupt (open) the circuit when the momentary switch is activated.

Negative Space: As used in this disclosure, negative space is a method of defining an object through the use of open or empty space as the definition of the object itself, or, through the use of open or empty space to describe the boundaries of an object.

Not Significantly Different: As used in this disclosure, the term not significantly different compares a specified property of a first object to the corresponding property of a reference object (reference property). The specified property is considered to be not significantly different from the reference property when the absolute value of the difference between the specified property and the reference property is less than 10.0% of the reference property value. A negligible difference is considered to be not significantly different.

One to One: When used in this disclosure, a one to one relationship means that a first element selected from a first set is in some manner connected to only one element of a second set. A one to one correspondence means that the one to one relationship exists both from the first set to the second set and from the second set to the first set. A one to one fashion means that the one to one relationship exists in only one direction.

Pan: As used in this disclosure, a pan is a hollow and prism-shaped containment structure. The pan has a single open face. The open face of the pan is often, but not always, the superior face of the pan. The open face is a surface selected from the group consisting of: a) a congruent end of the prism structure that forms the pan; and, b) a lateral face of the prism structure that forms the pan. A semi-enclosed pan refers to a pan wherein the closed end of prism structure of the pan and/or a portion of the closed lateral faces of the pan are open.

Perimeter: As used in this disclosure, a perimeter is one or more curved or straight lines that bounds an enclosed area on a plane or surface. The perimeter of a circle is commonly referred to as a circumference.

Perimetrical Boundary: As used in this disclosure, a perimetrical boundary is a hypothetical rectangular block that contains an object. Specifically, the rectangular block selected to be the perimetrical boundary is the rectangular block with the minimum volume that fully contains the object. In a two-dimensional structure, the perimetrical boundary is the rectangle with the minimum surface area.

Phase: As used in this disclosure, phase refers to the state of the form of matter. The common states of matter are solid, liquid, gas, and plasma.

Phase Change Terminology: As used in this disclosure, the following terms are used to describe a phase change. A phase change from a solid phase to a liquid phase is called melting. A phase change from a liquid phase to a solid phase is called freezing or solidification. A phase change from a solid phase to a gas phase is called sublimation. A phase change from a gas phase to a solid phase is called deposition. A phase change from a liquid phase to a gas phase is called evaporation. A phase change from a gas phase to a liquid phase is called condensation. A phase change from a gas phase to a plasma phase is called ionization. A phase change from a plasma phase to a gas phase is called recombination.

Plasma: As used in this disclosure, plasma refers to a state (phase) of matter wherein the outer valence electrons of an atom (or molecule) have been separated from their nucleus but remain with the matter. A plasma is an electrically neutral state of matter that is formed from the ions of the separated atoms. Plasmas generally, but not necessarily behaves like a gas in that a plasma fills the volume of the structure that contains it. The flow of a plasma through the atmosphere is called an arc. An arc is generally created when the atmosphere is subjected to an electric field that ionizes the molecules forming the atmosphere.

Plug: As used in this disclosure, a plug is an electrical termination that electrically connects a first electrical circuit to a second electrical circuit or a source of electricity. In this disclosure, plug will insert into a port. As used in this disclosure, a plug will have two or three metal pins.

Port: As used in this disclosure, a port is an electrical termination that is used to connect a first electrical circuit to a second external electrical circuit. In this disclosure, the port is designed to receive a plug.

Pressure: As used in this disclosure, pressure refers to a measure of force per unit area.

Pressure Switch: As used in this disclosure, a pressure switch is an electrical switch that actuated by an applied pressure.

Primary Shape: As used in this disclosure, the primary shape refers to a description of the rough overall geometric shape of an object that is assembled from multiple components or surfaces.

Primary Structure: As used in this disclosure, a primary structure refers to the component of an object that the other components attach to. The primary structure is also called the base structure.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Relaxed Shape: As used in this disclosure, a structure is considered to be in its relaxed state when no shear, strain, or torsional forces are being applied to the structure.

Roll: As used in this disclosure, a roll is a method of storing paper or other sheeting as a cylindrical structure such that creases are not formed within the paper or sheeting. To form the roll, the paper or other sheeting material is curved over itself around a center axis such that a spiral is formed when the roll is viewed from the end of the cylindrical structure.

Roughly: As used in this disclosure, roughly refers to a comparison between two objects. Roughly means that the difference between one or more parameters of the two compared objects are not significantly different.

Sandwich: As used in this disclosure, to sandwich means to insert a first disk-shaped structure between a second disk-shaped structure and a third disk-shaped structure to form a composite prism structure. Specifically: a) a first congruent end of the first disk-shaped structure is placed against a first interior congruent end of the second disk-shaped structure; and, b) a second congruent end of the first disk-shaped structure is placed against a second interior congruent end of the third disk-shaped structure. A first exterior congruent end of the second disk-shaped structure forms a first overall congruent end of the overall composite prism structure described in this definition. A second exterior congruent end of the third disk-shaped structure forms a second overall congruent end of the overall composite prism structure described in this definition. The second overall congruent end of the overall composite prism structure is distal from the first overall congruent end. The verb to sandwich describes the act of placing the first disk-shaped structure between the second disk-shaped structure and the third disk-shaped structure.

Scroll: As used in this disclosure, a scroll is a sheeting that is stored as a roll.

Semi-Rigid Structure: As used in this disclosure, a semi-rigid structure is a solid structure that is stiff but not wholly inflexible and that will deform under force before breaking. A semi-rigid structure may or may not behave with an elastic nature in that a semi-rigid structure need not return to its relaxed shape.

Semitransparent: As used in this disclosure, semitransparent refers to an object that is partially transparent. By partially transparent is meant: a) that only a proportion of the light that strikes a semitransparent structure will pass through the semitransparent structure; and, b) that the light is scattered as it passes through the semitransparent structure such that objects cannot be clearly seen through the semitransparent structure.

Sheeting: As used in this disclosure, a sheeting is a material, such as a paper, textile, a plastic, or a metal foil, in the form of a thin flexible layer or layers. The sheeting forms a disk structure. The two surfaces of the sheeting with the greatest surface area are called the faces of the sheeting.

Solid: As used in this disclosure, a solid refers to a state (phase) of matter that: 1) has a fixed volume; and, 2) does not flow.

Superior: As used in this disclosure, the term superior refers to a directional reference that is parallel to and in the opposite direction of the force of gravity when an object is positioned or used normally.

Supporting Surface: As used in this disclosure, a supporting surface is a horizontal surface upon which an object is placed and to which the load of the object is transferred. This disclosure assumes that an object placed on the supporting surface is in an orientation that is appropriate for the normal or anticipated use of the object.

Switch: As used in this disclosure, a switch is an electrical device that starts and stops the flow of electricity through an electric circuit by completing or interrupting an electric circuit. The act of completing or breaking the electrical circuit is called actuation. Completing or interrupting an electric circuit with a switch is often referred to as closing or opening a switch respectively. Completing or interrupting an electric circuit is also often referred to as making or breaking the circuit respectively.

Termination: As used in this disclosure, a termination is an electrical device that electrically connects to the end of an electric circuit path.

Texture: As used in this disclosure, a texture is a tactile or three-dimensional characteristic of a surface. In daily use, texture will on occasion refer to a visual characteristic of the surface.

Transparent: As used in this disclosure, transparent refers to a material that allows light to pass through the material without significant scattering such that an object can be clearly seen through the material.

Tube: As used in this disclosure, a tube is a hollow prism-shaped device formed with two open congruent ends. The tube is used for transporting liquids (including bulk solids) and gases. The line that connects the center of the first congruent face of the prism to the center of the second congruent face of the prism is referred to as the center axis of the tube or the centerline of the tube. When two tubes share the same centerline they are said to be aligned. When the centerlines of two tubes are perpendicular to each other, the tubes are said to be perpendicular to each other. In this disclosure, the terms inner dimensions of a tube and outer dimensions of a tube are used as they would be used by those skilled in the plumbing arts.

Vacuum: As used in this disclosure, vacuum is used to describe a first space that contains gas at a reduced gas pressure relative to the gas pressure of a second space. If the first space and the second space are connected together, this pressure differential will cause gas from the second space to move towards the first space until the pressure differential is eliminated.

Vertical: As used in this disclosure, vertical refers to a direction that is either: 1) perpendicular to the horizontal direction; 2) parallel to the local force of gravity; or, 3) when referring to an individual object the direction from the designated top of the individual object to the designated bottom of the individual object. In cases where the appropriate definition or definitions are not obvious, the second option should be used in interpreting the specification. Unless specifically noted in this disclosure, the vertical direction is always perpendicular to the horizontal direction.

Water: As used in this disclosure, water (CAS 7732-18-5) is a molecule comprising two hydrogen atoms and one oxygen molecule. The phase of water at normal temperature and pressure is liquid. As used in this disclosure, the definition of water is expanded to include dilute water-based solutions of salts and ionic structures using water as the solvent. Water in a gas phase is often referred to as steam. Water in a solid phase is often referred to as ice. Snow refers to a bulk solid form of ice.

With respect to the above description, it is to be realized that the optimum dimensional relationship for the various components of the invention described above and in FIGS. 1 through 7 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. An ice-preventing heated mat comprising
a mat structure and a control circuit;
wherein the mat structure forms the primary structure of the ice-preventing heated mat;
wherein the control circuit generates the heat used to melt the snow and ice;
wherein the ice-preventing heated mat is configured to form a barrier between a ground and an environment such that snow and ice accumulates on the superior surface of the ice-preventing heated mat;
wherein the ice-preventing heated mat melts the snow and ice that accumulates on the ice-preventing heated mat;
wherein the ice-preventing heated mat is used: a) in an individual mode; and, b) in an interoperation mode;
wherein in the interoperation mode, multiple instantiations of the ice-preventing heated mat are mechanically and electrically interconnected to form a larger surface area over which snow and ice can be melted;
wherein the elastic nature of the mat structure allows the mat structure to be deployed onto the ground from a scrolled structure;
wherein the elastic nature of the mat structure allows the mat structure to be collapsed (rolled) back into the scroll structure for storage;
wherein the control circuit mounts within the mat structure;
wherein the mat structure comprises a composite structure and a drainage manifold;
wherein the drainage manifold is a fluid network that is installed within the composite structure;
wherein the drainage manifold captures liquid phase water that seeps into the composite structure during the melting of the snow and ice;
wherein the drainage manifold forms a fluidic connection with the control circuit;
wherein the control circuit draws any water accumulated within the drainage manifold out of the drainage manifold;
wherein the control circuit discharges the water removed from the drainage manifold of the ice-preventing heated mat.

2. The ice-preventing heated mat according to claim 1
wherein the composite structure forms the primary structure of the mat structure;
wherein the composite structure is an elastomeric structure;
wherein the composite structure has a composite prism structure;
wherein the composite structure has a disk shape;

wherein the elastic nature of the composite structure allows the composite structure to be deployed onto the ground from a scrolled structure;
wherein the elastic nature of the composite structure allows the composite structure to be collapsed (rolled) back into the scroll structure for storage;
wherein the composite structure is placed on the ground that is to be protected from the snow and ice;
wherein the composite structure forms the physical protective barrier that prevents the snow and ice from reaching the ground.

3. The ice-preventing heated mat according to claim 2
wherein the control circuit is an electric circuit;
wherein the control circuit generates the heat necessary to melt the ground that has fallen on the superior layer;
wherein the control circuit provides the motive forces that pump any water that has accumulated in the mat structure out of the mat structure;
wherein the control circuit generates an illumination that is visible from the environment surrounding the mat structure;
wherein the control circuit initiates generating the illumination when an individual steps on the mat structure;
wherein the control circuit discontinues generating the illumination when the individual steps off of the mat structure.

4. The ice-preventing heated mat according to claim 3
wherein the composite structure further comprises an inferior layer, a heat transfer layer, an illumination layer, and a superior layer;
wherein the inferior layer, the heat transfer layer, the illumination layer, and the superior layer are stacked to form the composite structure.

5. The ice-preventing heated mat according to claim 4
wherein the control circuit comprises a heating element, a vacuum pump, an illumination circuit, a plurality of switches, a plurality of electric terminations, and an external power source;
wherein the heating element, the vacuum pump, the illumination circuit, the plurality of switches, the plurality of electric terminations, and the external power source are electrically interconnected;
wherein the external power source is an externally provided source of electric energy.

6. The ice-preventing heated mat according to claim 5
wherein the inferior layer forms the inferior structure of the mat structure;
wherein the inferior layer is an elastomeric structure;
wherein the inferior layer has a composite prism structure;
wherein the inferior layer has a disk shape;
wherein the inferior layer forms the structure of the mat structure that is placed in contact with the ground;
wherein the elastic nature of the inferior layer allows the mat structure to be deployed onto the ground from a scrolled structure;
wherein the elastic nature of the inferior layer allows the mat structure to be collapsed (rolled) back into the scroll structure for storage;
wherein the inferior congruent end of the inferior layer is formed with a texture.

7. The ice-preventing heated mat according to claim 6
wherein the heat transfer layer forms a layer of the composite prism structure of the mat structure;
wherein the heat transfer layer is an elastomeric structure;
wherein the heat transfer layer has a composite prism structure;
wherein the heat transfer layer has a disk shape;
wherein the elastic nature of the heat transfer layer allows the mat structure to be deployed onto the ground from a scrolled structure;
wherein the elastic nature of the heat transfer layer allows the mat structure to be collapsed (rolled) back into the scroll structure for storage;
wherein the heat transfer layer is geometrically identical to the inferior layer;
wherein the heat transfer layer is geometrically identical to the illumination layer;
wherein the heat transfer layer is sandwiched between the inferior layer and the illumination layer;
wherein the heat transfer layer attaches to the illumination layer such that the perimeter of the congruent end of the heat transfer layer aligns with the perimeter of the congruent end of the illumination layer of the composite structure;
wherein the heat transfer layer attaches to the inferior layer such that the perimeter of the congruent end of the heat transfer layer aligns with the perimeter of the congruent end of the inferior layer of the composite structure;
wherein the elements of the control circuit that are used to generate the heat used to melt the snow and ice are contained within the heat transfer layer.

8. The ice-preventing heated mat according to claim 7
wherein the illumination layer forms a layer of the composite prism structure of the mat structure;
wherein the illumination layer is an elastomeric structure;
wherein the illumination layer has a composite prism structure;
wherein the illumination layer has a disk shape;
wherein the elastic nature of the illumination layer allows the mat structure to be deployed onto the ground from a scrolled structure;
wherein the elastic nature of the illumination layer allows the mat structure to be collapsed (rolled) back into the scroll structure for storage;
wherein the illumination layer is geometrically identical to the heat transfer layer;
wherein the illumination layer is geometrically identical to the superior layer;
wherein the illumination layer is sandwiched between the heat transfer layer and the superior layer;
wherein the illumination layer attaches to the superior layer such that the perimeter of the congruent end of the illumination layer aligns with the perimeter of the congruent end of the superior layer of the composite structure;
wherein the illumination layer attaches to the heat transfer layer such that the perimeter of the congruent end of the illumination layer aligns with the perimeter of the congruent end of the heat transfer layer of the composite structure;
wherein the elements of the control circuit that are used to generate the illumination of the control circuit are contained within the illumination layer.

9. The ice-preventing heated mat according to claim 8
wherein the superior layer forms the superior structure of the mat structure;
wherein the superior layer is an elastomeric structure;
wherein the superior layer has a composite prism structure;
wherein the superior layer has a disk shape;
wherein the superior layer forms the structure of the mat structure that is distal from the ground;

wherein the elastic nature of the superior layer allows the mat structure to be deployed onto the ground from a scrolled structure;

wherein the elastic nature of the superior layer allows the mat structure to be collapsed (rolled) back into the scroll structure for storage;

wherein the superior congruent end of the superior layer is formed with a texture;

wherein the superior layer is a semitransparent structure;

wherein the superior layer overlays the illumination layer such that the illumination generated by the control circuit is visible from the environment surrounding the mat structure.

10. The ice-preventing heated mat according to claim 9 wherein the heating element is an electric device;

wherein the heating element is a resistive heating element;

wherein the heating element converts electric energy into heat;

wherein the heat generated by the heating element melts the snow and ice that has accumulated on the superior surface of the mat structure;

wherein the heating element installs within the heat transfer layer of the composite structure of the mat structure.

11. The ice-preventing heated mat according to claim 10 wherein the vacuum pump is an electrical device;

wherein the vacuum pump forms a fluidic connection with the drainage manifold of the mat structure;

wherein the vacuum pump converts electric energy into a pressure differential across the drainage manifold;

wherein the pressure differential generated by the vacuum pump draws water out of the drainage manifold;

wherein the vacuum pump discharges the drawn water from the ice-preventing heated mat;

wherein the vacuum pump mounts in the mat structure.

12. The ice-preventing heated mat according to claim 11 wherein the illumination circuit is an electric circuit;

wherein the illumination circuit converts electric energy into electromagnetic radiation;

wherein the illumination circuit installs within the illumination layer of the composite structure of the mat structure;

wherein the illumination circuit installs within the illumination layer such that the illumination generated by the illumination circuit is visible through the semitransparent structure of the superior layer of the mat structure.

13. The ice-preventing heated mat according to claim 12 wherein each switch selected from the plurality of switches is an electric circuit element;

wherein each switch selected from the plurality of switches controls the flow of electric energy through the control circuit;

wherein each electric termination selected from the plurality of electric terminations forms an electric connection between an electric structure selected from the group consisting of: a) the external power source; and, b) a second instantiation of the ice-preventing heated mat;

wherein the plurality of switches further comprises a master switch and a pressure switch;

wherein the master switch is an electric switch;

wherein the master switch is a maintained switch;

wherein the master switch controls the flow of electric energy from the external power source into the control circuit of any instantiation of the ice-preventing heated mat;

wherein the master switch is also used to control the flow of electric energy from any other instantiation of the ice-preventing heated mat into the ice-preventing heated mat;

wherein the pressure switch is a pressure plate switch;

wherein the pressure switch mounts in the superior layer of the composite structure of the mat structure;

wherein the pressure switch controls the flow of electric energy into the illumination circuit of the control circuit;

wherein the pressure switch enables the flow of electric energy into the illumination circuit when the pressure switch detects the weight of an individual on the superior surface of the composite structure;

wherein the pressure switch disables the flow of electric energy into the illumination circuit when the pressure switch does not detect any weight on the superior surface of the composite structure.

14. The ice-preventing heated mat according to claim 13 wherein the plurality of electric terminations are used to receive electric energy from the external power source;

wherein the plurality of electric terminations are further used to share electric energy between multiple instantiations of the ice-preventing heated mat;

wherein the plurality of electric terminations further comprises a transfer plug and a transfer port;

wherein the transfer port is an electric port;

wherein the transfer port forms an electric connection with an electric circuit selected from the group consisting of: a) a plug associated with the external power source; and b) the transfer plug of another instantiation of the control circuit of another instantiation of the ice-preventing heated mat;

wherein the transfer port shares electric energy between the control circuit and the selected electric circuit;

wherein the transfer plug is an electric port;

wherein the transfer plug forms an electric connection the transfer port of another instantiation of the control circuit of another instantiation of the ice-preventing heated mat;

wherein the transfer plug shares electric energy between the control circuit and the other instantiation of the control circuit of the ice-preventing heated mat.

\* \* \* \* \*